(12) United States Patent
Millington

(10) Patent No.: US 6,397,145 B1
(45) Date of Patent: May 28, 2002

(54) NAVIGATION SYSTEM WITH COMPLEX MANEUVER INSTRUCTION

(75) Inventor: Jeffrey Alan Millington, Rochester Hills, MI (US)

(73) Assignee: Magellan DIS, Inc., Rochester Hills, MI (US)

( * ) Notice: Subject to any disclaimer, the term of this patent is extended or adjusted under 35 U.S.C. 154(b) by 0 days.

(21) Appl. No.: 09/519,143

(22) Filed: Mar. 6, 2000

(51) Int. Cl.⁷ .............................. G08G 1/123
(52) U.S. Cl. ........................ 701/211; 701/208
(58) Field of Search ................. 701/207, 208, 701/209, 211, 212, 213; 340/990, 995, 991, 998, 988, 905

(56) References Cited

U.S. PATENT DOCUMENTS

| | | | |
|---|---|---|---|
| 4,782,447 A | 11/1988 | Ueno et al. .................. 364/449 |
| 5,043,902 A | 8/1991 | Yokoyama et al. ......... 364/449 |
| 5,113,185 A | 5/1992 | Ichikawa .................... 340/995 |
| 5,243,529 A | 9/1993 | Kashiwazaki ............... 364/449 |
| 5,606,414 A | 2/1997 | Minden ....................... 356/350 |
| 5,612,882 A | 3/1997 | LeFebvre et al. ........ 364/449.3 |
| 5,654,892 A | 8/1997 | Fujii et al. ............... 364/449.5 |
| 5,731,766 A | 3/1998 | Akamatsu ................... 340/988 |
| 5,848,364 A | 12/1998 | Ohashi ........................ 701/26 |
| 5,925,091 A | 7/1999 | Ando ......................... 701/212 |
| 6,107,944 A | * 8/2000 | Behr et al. .................. 701/211 |
| 6,108,604 A | * 9/2000 | Fakaga et al. .............. 701/209 |
| 6,115,669 A | * 9/2000 | Watanabe et al. ........... 701/209 |
| 6,249,740 B1 | * 6/2001 | Ito et al. ..................... 701/211 |

FOREIGN PATENT DOCUMENTS

FR 357211510 * 12/1982 ................. 701/211

OTHER PUBLICATIONS

Magellan Driver Information Systems PathMaster Operator Guide issued Aug. 1, 1997, pp. 28 and 29.

* cited by examiner

*Primary Examiner*—Richard M. Camby
(74) *Attorney, Agent, or Firm*—Carlson, Gaskey & Olds PC

(57) ABSTRACT

A vehicle navigation system provides a complex maneuver instruction view which displays multiple maneuver instructions concatenated together. If a relative distance between two of upcoming maneuvers is less than a predetermined distance, and no intervening roads fall within the predetermined distance the complex maneuver instruction view is displayed. As the user completes the first maneuver instruction, the maneuver instruction disappears and only the second maneuver instruction is displayed. In another disclosed embodiment, the navigation system displays a maneuver sequence notation adjacent each maneuver instruction along a recommended route to provide the user with a frame of reference as the user proceeds along a recommended route.

34 Claims, 4 Drawing Sheets

NAVIGATION SYSTEM WITH COMPLEX MANEUVER INSTRUCTION

BACKGROUND OF THE INVENTION

This invention generally relates to navigation or route guidance systems and, more particularly, to a navigation system that provides maneuver sequence notation adjacent each maneuver instruction and concatenates individual maneuver instructions to enhance the ability of a driver to correctly perceive a complex maneuver instruction.

Navigation systems generally provide a recommended route to a desired destination. Generally, the starting point and desired destination are selected from a large database of roads stored in a mass media storage, such as a CD ROM, which includes the roads in the area to be traveled by the user. If the navigation system is installed in a vehicle, the starting point is typically associated with the vehicle position and can be input to the navigation system by an associated position determining system that usually includes a GPS (Global Positioning System) receiver.

The navigation system determines a route to the destination utilizing an algorithm well-known to those in the art and currently in use in many navigation systems. Usually there are many potential routes between the selected starting point and the desired destination. Typical navigation systems select a recommended route based upon certain "cost" values associated with each segment of road in the road database. These cost values include the length of the road segment and the estimated time of travel through the road segment. The navigation system selects the potential route with the lowest total cost to be the recommended route. Depending upon the predetermined algorithm of the navigation system, the navigation system will recommend the route with the shortest total length, the lowest total time, or some weighted average of length and time.

The recommended route is then displayed to the user as a map showing the starting point and desired destination and highlighting the recommended route. Preferably, if the navigation system is installed in a vehicle, the navigation system displays the current position of the vehicle and provides visual turn-by-turn instructions to the driver, guiding the driver to the selected destination.

Many navigation systems also provide turn-by-turn instruction to the driver. The turn-by-turn instruction is typically selected from a database of predefined maneuver instructions such as a generic left-turn instruction, a right-turn instruction straight ahead instruction or the like. Highly congested and road intense environment such as a city may require two maneuvers in close proximity or other unusual maneuvers to continue along a recommended route. For example, a complex maneuver may require a second maneuver immediately after a first maneuver with an intersection located between the first and second maneuver. This can be confusing as the driver may have trouble identifying the maneuver instruction with the correct road. This is particularly troubling when a plurality of similar instructions are individually provided in a road intense environment.

It is thus desirable to provide a system for distinctively identifying maneuver instructions to enhance the ability of a driver to correctly perceive the maneuver instruction.

SUMMARY OF THE INVENTION

In general terms, this invention provides a vehicle navigation that provides maneuver sequence notation adjacent each maneuver instruction and concatenates individual maneuver instructions to enhance the ability of a driver to correctly perceive a complex maneuver instruction.

The navigation system generally includes a database of a plurality of roads, a position determining system, an input device, and a route determination system. The position determining system determines a position of the vehicle relative to the plurality of roads. The user selects a destination from the database with the input device. The navigation system then calculates and displays a recommended route directing the driver of the vehicle to the desired destination. Preferably, the navigation system displays turn-by-turn instructions to the desired destination.

As the vehicle approaches an upcoming maneuver the display switches from a large-scale map display view to a maneuver instruction view. The maneuver instruction view indicates to the driver the next maneuver to be performed along the recommended route to the destination.

During many simple maneuvers, such as an individual left or right turn, a single maneuver instruction representation, such as by a 3-dimensional turn arrow is displayed in a known manner. The maneuver instruction illustrates the upcoming maneuver to be performed along the recommended route to the destination. However, in some instances a user may be required to perform two maneuvers in close proximity or other unusual maneuvers to continue along a recommended route. Such complex maneuvers are typical in metro areas and may lead a user to incorrectly perform the maneuver. When such a complex maneuver is required the present invention switches to a complex maneuver instruction view which displays multiple maneuver instructions concatenated together to enhance the ability of a driver to correctly perceive a complex maneuver instruction.

Display of the complex maneuver instruction view is preferably related to the relationship of the upcoming maneuvers. The complex maneuver instruction view illustrates at least two maneuver instructions. Each maneuver instruction may comprise a 3-dimensional arrow superimposed on a 3-dimensional representation of the intersection. Preferably, as the user completes the first maneuver, the first maneuver instruction disappears and only the second maneuver instruction is displayed. In a disclosed embodiment, if a relative distance between two consecutive upcoming maneuvers is less than a predetermined distance, the complex maneuver instruction view is displayed. However, if these conditions are not met, a known single maneuver instruction view is displayed to separately display a maneuver instruction for each upcoming maneuver.

In another disclosed embodiment, the navigation system displays a plurality of maneuver sequence notations along the recommended route. The maneuver sequence notations are preferably alphanumeric such as "1", "2", "3" . . . , "A", "B", "C" . . . , or the like. The maneuver sequence notations indicate to the user the sequence and location of upcoming maneuvers along the recommended route. The maneuver sequence notation provides the user with a frame of reference as the user proceeds along a recommended route.

The maneuver sequence notation is preferably displayed both on the map display view and on the complex or single maneuver instruction view. In this way, the user immediately understands the upcoming maneuvers during the shift from the map display view to the maneuver instruction view.

The user is thereby provided with clear instruction through the complex maneuver and is less likely to incorrectly perform the maneuver. This is particularly advantageous in a highly congested or road intense environment such as a city.

BRIEF DESCRIPTION OF THE DRAWINGS

These and other features and advantages of this invention will become more apparent to those skilled in the art from the following detailed description of the presently preferred embodiment. The drawings that accompany the detailed description can be described as follows.

DETAILED DESCRIPTION OF THE PREFERRED EMBODIMENT

Figure 1:
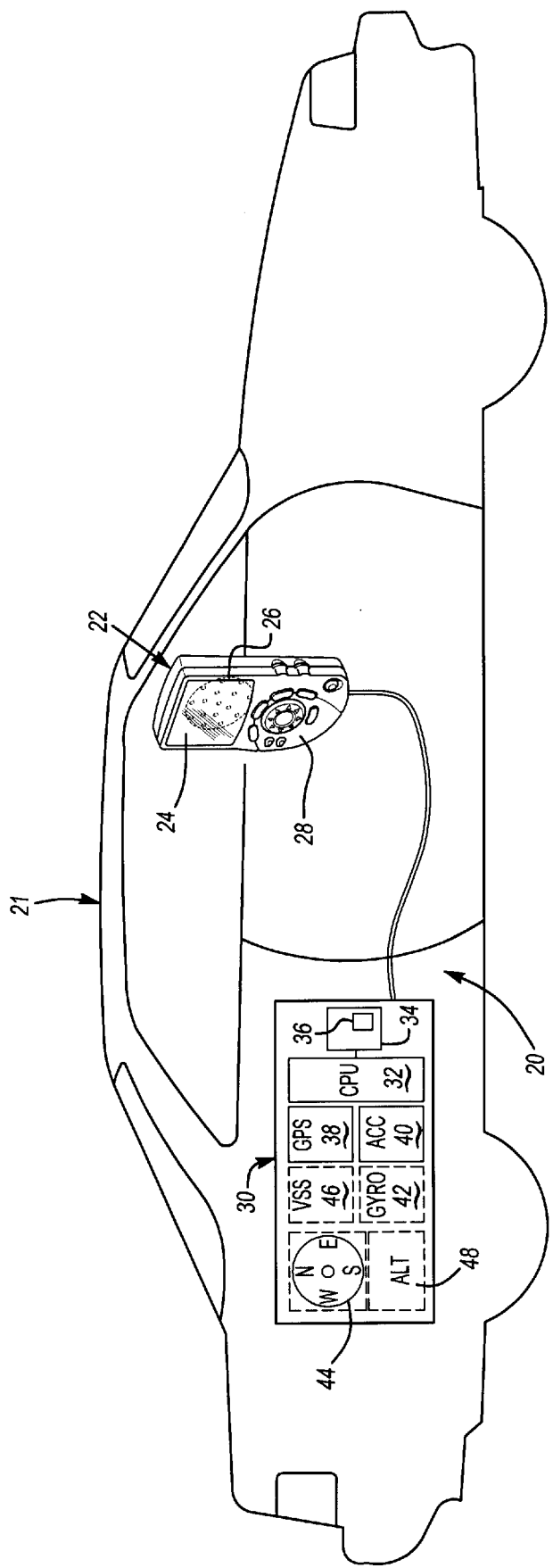
FIG. 1 is a schematic of a navigation system according to the present invention.

The navigation system 20 of the present invention is shown schematically in FIG. 1 installed in a vehicle 21. The navigation system 20 includes an Operator Interface Module ("OIM") 22 including input and output devices. The OIM 22 includes a display 24, such as a high resolution LCD or flat panel display, and an audio speaker 26. The OIM 22 also includes input devices 28, preferably a plurality of buttons and directional keypad, but alternatively including a mouse, keyboard, keypad, remote device or microphone. Alternatively, the display 24 can be a touch screen display.

The navigation system 20 further includes a computer module 30 connected to the OIM 22. The computer module 30 includes a CPU 32 and storage device 34 connected to the CPU 32. The storage device 34 may include a hard drive, CD ROM, DVD, RAM, ROM or other optically readable storage, magnetic storage or integrated circuit. The storage device 34 contains a database 36 including a map of all the roads in the area to be traveled by the vehicle 21 as well as the locations of potential destinations, such as addresses, hotels, restaurants, or previously stored locations. The software for the CPU 32, including the graphical user interface, route guidance, operating system, position-determining software, etc may also be stored in storage device 34 or alternatively in ROM, RAM or flash memory.

The computer module 30 preferably includes navigation sensors, such as a GPS receiver 38 and an inertial sensor, which is preferably a multi-axis accelerometer 40. The computer module 30 may alternatively or additionally include one or more gyros 42, a compass 44, a wheel speed sensor 46 and altimeter 48, all connected to the CPU 32. Such position and motion determining devices (as well as others) are well known and are commercially available.

The navigation system 20 propagates the position of the vehicle 21 relative to the map database 36, i.e. relative positions on road segments and intersections ("nodes"). The navigation system 20 also determines the current location of the vehicle 21 in terms of latitude and longitude. Utilizing any of a variety of known techniques, the position of the vehicle 21 relative to the map database 36 and/or in terms of latitude and longitude is determined at least in part based upon the motion signals from the multi-axis accelerometer 40. The current local time and date can be determined from the GPS signals received by the GPS receiver 38.

Generally, the CPU 32 and position and motion determining devices determine the position of the vehicle 21 relative to the database 36 of roads utilizing dead reckoning, map-matching, etc. Further, as is known in navigation systems, the user can select a destination relative to the database 36 of roads utilizing the input device 28 and the display 24. The navigation system 20 then calculates and displays a recommended route directing the driver of the vehicle 21 to the desired destination. Preferably, the navigation system 20 displays turn-by-turn instructions on display 24 and gives corresponding audible instructions on audio speaker 26, guiding the driver to the desired destination.

Figure 2:
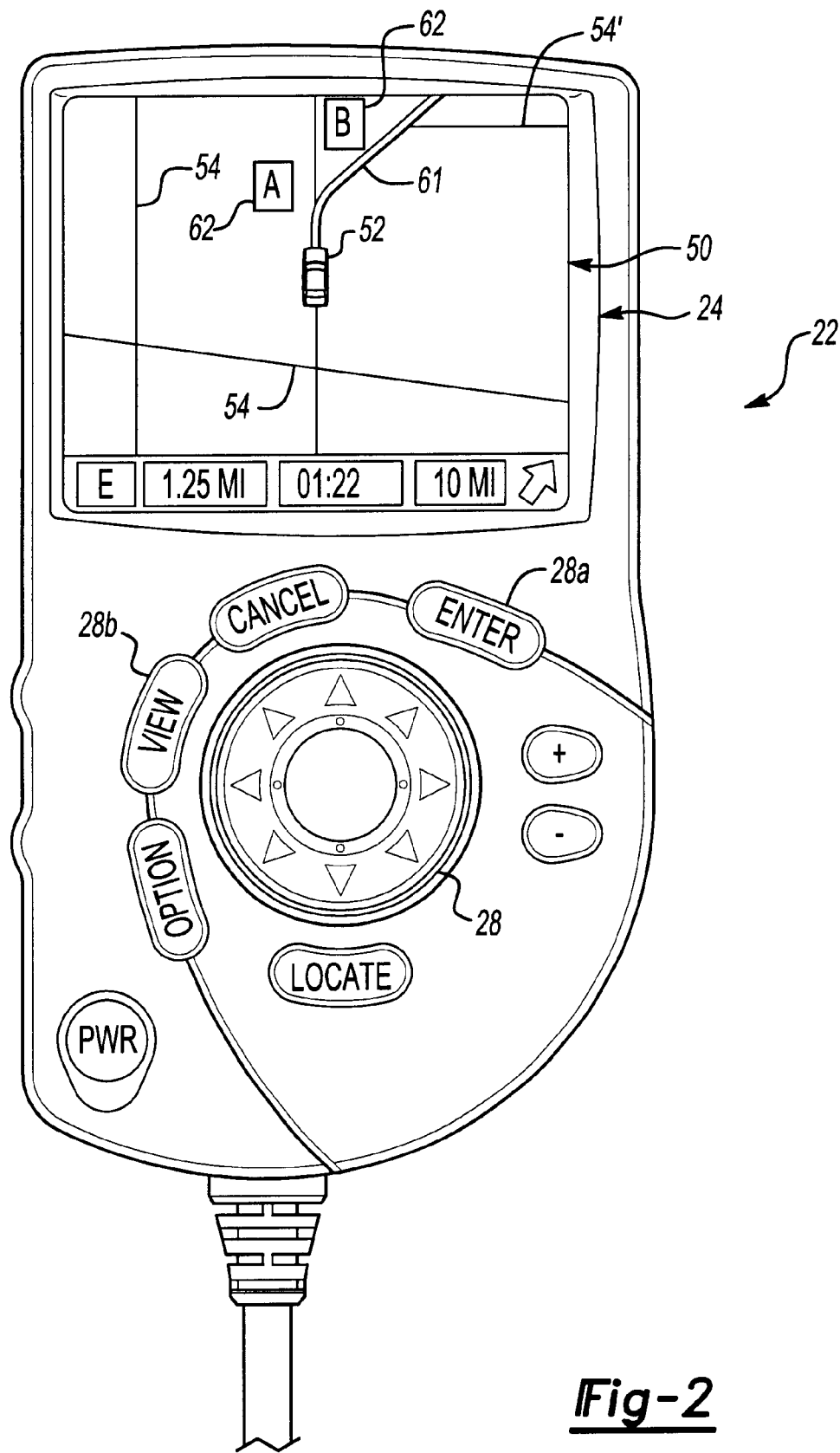
FIG. 2 is the OIM of the navigation system illustrated in FIG. 1 showing a map display including maneuver sequence notations.

FIG. 2 illustrates the OIM 22. As can be seen in FIG. 2, the input devices 28 include an "enter" key 28a. The display 24 is in a map display mode displaying a map view 50, including a vehicle icon 52 representing the current position of the vehicle 21 on roads 54. The navigation system 20 is in a route guidance mode and displays a recommended route 61. The navigation system 20 displays the current position by displaying the vehicle icon 52 relative to the roads 54, on display 24. The map display view 50 of FIG. 2 is normally displayed with the heading of the vehicle icon 52 directed upwards with the map of roads 54 moving and rotating based upon movement of the vehicle 21. However, the map display view 50 can also display a movable vehicle icon 52 relative to a constant heading display 24 (such as North up), based upon user preference.

Preferably, the navigation system 20 displays a plurality of maneuver sequence notation 62 along the recommended route 61. The maneuver sequence notation 62, such as "1", "2", "3" . . . "A", "B", "C" . . . or the like, indicates to the user the sequence and location of upcoming maneuvers along the recommended route 61. The first upcoming maneuver is labeled as "1" or "A", then each of the subsequent upcoming maneuvers are sequentially labeled. Preferably, the maneuver sequence notations 62 are not reused along the calculated recommended route 61. Each upcoming maneuver is distinctively labeled until a new recommended route 61 is calculated. The maneuver sequence notation 62 is calculated by the CPU 32 and provides the user with a frame of reference as the user proceeds along the recommended route 61.

Figure 3:
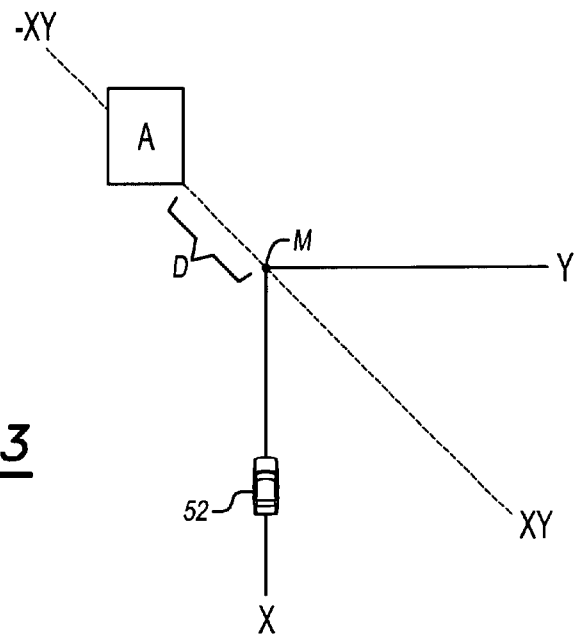
FIG. 3 illustrates a vector calculation methodology of locating the maneuver sequence notations according to the present invention.

In route guidance mode (FIG. 2) the navigation system 20 displays the maneuver sequence notations 62 adjacent each upcoming maneuver. Preferably, the CPU 32 locates the maneuver sequence notation 62 proximate the upcoming maneuver to provide a clear indication of where the upcoming maneuver is located along the recommended route 61, while preventing the maneuver sequence notation 62 from obscuring the upcoming maneuver. In a disclosed embodiment the maneuver sequence notations 62 are preferably calculated by vector addition. For example only, referring to FIG. 3, the vehicle 52 is travelling along a first road segment X and must turn onto a second road segment Y at upcoming maneuver M. To determine the location of maneuver sequence notation 62, segment X and segment Y are averaged to obtain vector XY. The negative of segment XY is then calculated to obtain vector -XY. The maneuvers sequence notation 62 is then located along vector -XY at a distance D from upcoming maneuver M. Preferably D is calculated to locate the maneuver sequence notation 62 adjacent the maneuver instruction while preventing the maneuver sequence notation 62 from obscuring the upcoming maneuver. This can be accomplished by locating the maneuver sequence notation 62 a predetermined number of pixels along vector -XY and scaling the number of pixels in response to changes in the display 24 scale.

During many simple maneuvers, such as an individual left or right turn, a single maneuver instruction representation is displayed in a known manner. The maneuver instruction illustrates the upcoming maneuver to be performed along the recommended route to the destination. This is described in more detail in co-pending application U.S. Ser. No. 09/520096 filed on even date herewith under Express Mail No. EL491263376US and entitled NAVIGATION SYSTEM WITH IMPROVED ROUTE GUIDANCE DISPLAY MODES which is hereby incorporated by Reference in its entirety as if reproduced here. However, in some instances a user may be required to perform two maneuvers in close proximity or other unusual maneuvers to continue along the recommended route 61. Such maneuvers are typical in metro areas and may lead a user to incorrectly perform the maneuver. When such a maneuver is required the CPU 32 switches the display 24 to a complex maneuver instruction view 68 (FIG. 4) which displays multiple maneuver instructions.

Figure 4:
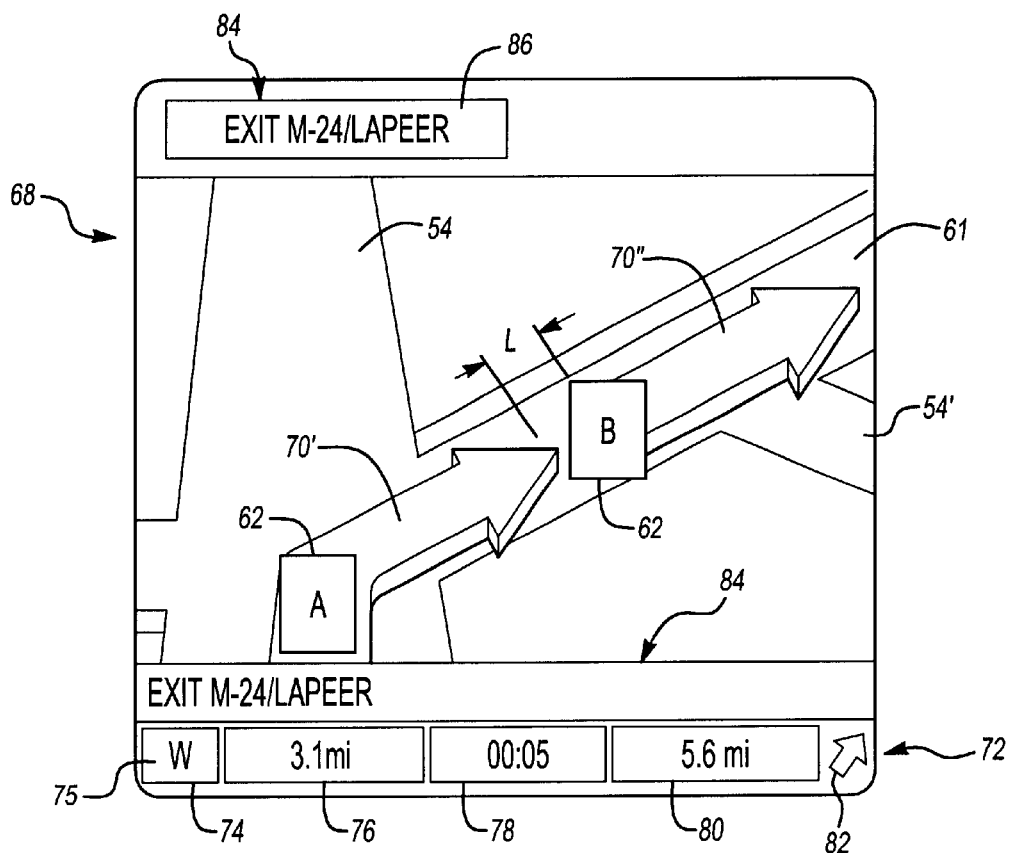
FIG. 4 is the display of FIG. 2 displaying a complex maneuver instruction view.

Referring to FIG. 4, as vehicle 21 approaches a complex upcoming maneuver the CPU 32 switches the display 24 from the map display view 50 (FIG. 2) to a complex maneuver instruction view 68. The CPU 32 preferably displays the complex maneuver instruction view 68 in place of the known single maneuver instruction view depending upon a relationship between the upcoming maneuvers.

The complex maneuver instruction view 68 displays a plurality of maneuver instructions concatenated together. Complex maneuver instruction view 68 illustrates at least two maneuver instructions 70, each preferably represented by a 3-dimensional arrow superimposed on the 3-dimensional representation of the intersection. In the disclosed embodiment, each 3-dimensional arrow maneuver instruction 70' and 70" is representative of a road segment having a predetermined length. Each upcoming maneuver instruction is preferably selected from the storage device 34 for display by the CPU 32 in a known manner. Because the maneuver instructions 70', 70" represent a road segment of a predetermined length, the CPU 32 can compare their relationship. For example only, if the relative distance between an end of the first maneuver instruction 70' (head of the 3-dimensional arrow) and a beginning of the second maneuver instruction 70" (tail of the 3-dimensional arrow) is less than a distance L, the complex maneuver instruction view 68 is displayed. In addition, another condition is preferably compared, for example assuring that no intersecting roads 54 fall within distance L. The intersecting roads 54 could confuse a driver if located between the maneuver instructions. However, if either of these conditions are not met, the known single maneuver instruction view is displayed for each upcoming maneuver.

Each maneuver instruction 7', 70" includes the maneuver sequence notation 62 previously displayed on the map display view 50 (FIG. 2). As illustrated in FIG. 4, the first maneuver instruction 7' includes the maneuver sequence notation 62 of "A". The second maneuver instruction 70" includes the maneuver sequence notation 62 of "B". In the disclosed embodiment, the maneuver sequence notation 62 is displayed at the tail of the 3-dimensional arrow representation. In this way, the user immediately understands the upcoming maneuvers during the shift from the map display view 50 to the complex maneuver instruction view 68. Preferably, as the user completes the first maneuver instruction 7', the maneuver instruction 7' disappears and only the second maneuver instruction 70" is displayed. The user is thereby provided with clear instruction through the complex maneuver and is less likely to incorrectly perform the maneuver.

Further information can also provided on the maneuver instruction view 68. A text instruction field 84 displays text of a maneuver instruction, such as "Exit M-24/Lapeer" or other turn instructions appropriate to the next maneuver. The text in the field 84 corresponds to the maneuver instruction 70.

An information bar 72 provides a compass heading 74, a distance to next maneuver field 76, a time to destination field 78, a distance to destination field 80, and a direction to destination "as the crow flies" field 82. Additionally, a background 75 of the compass heading 74 field is preferably changeable in color to indicate the quality of the GPS receiver 38 satellite fix. For example only, for a good satellite fix the background 75 color is green, if the fix is acceptable the background 75 color is yellow, and if the system is operating in an inertia mode without a GPS fix, the background 75 color is red.

The maneuver instruction view 68 also displays a countdown display such as a bar graph 84 which indicates the imminence of the upcoming maneuver. The bar graph 84 preferably begins one-tenth of one mile prior to the upcoming maneuver and is depleted as the vehicle approaches the upcoming maneuver. Alternatively or additionally, a text instruction field 86 can included within the bar graph 84 to indicate the distance to the upcoming maneuver. The bar graph 84 gradually and continuously decreases as the vehicle 20 approaches the maneuver. Portions of the bar graph 84 which overlap text become reverse video, as shown. The user is thereby provided with constant information on the distance to the upcoming maneuver. This is particularly advantageous in a highly congested or road intense environment such as a city.

Figure 5:
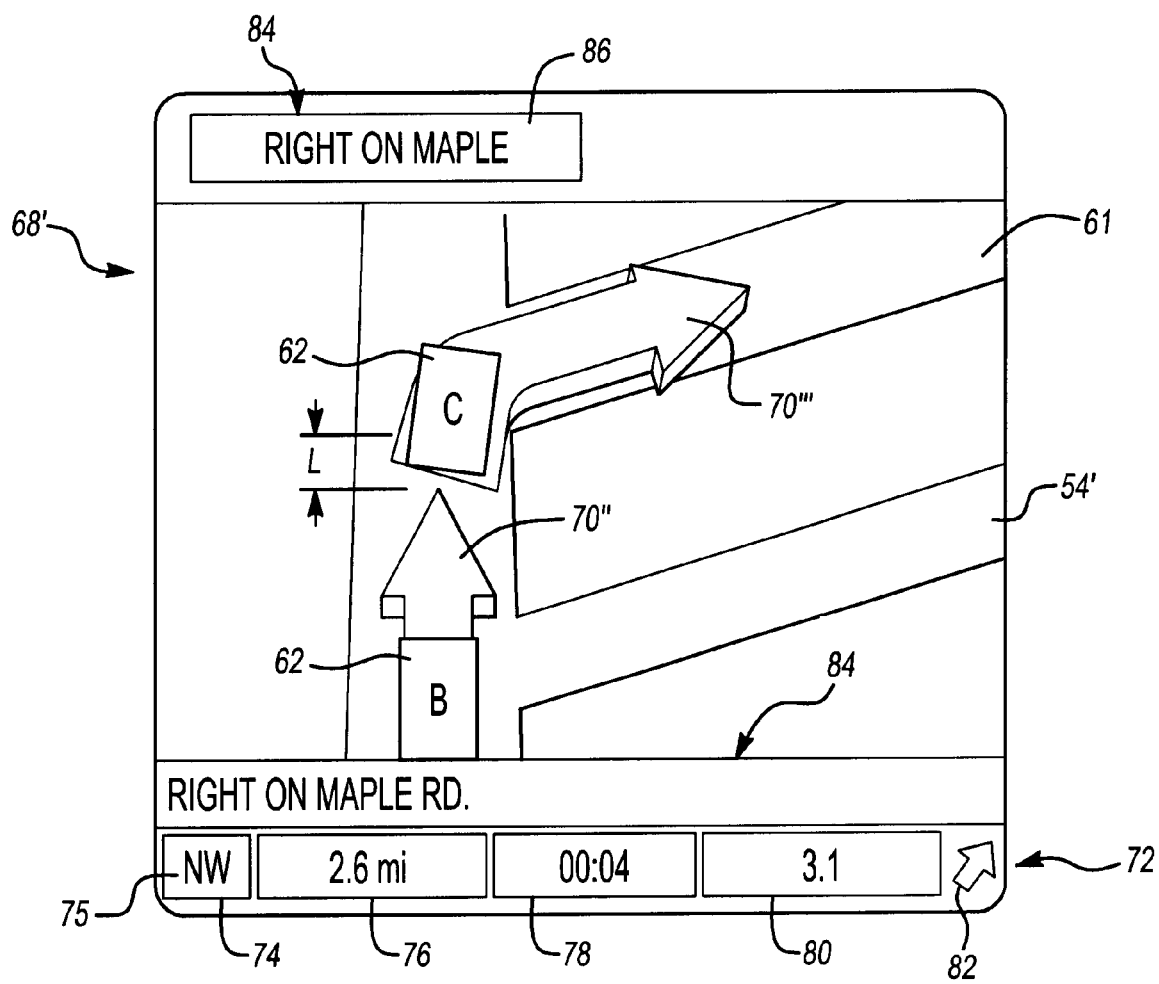
FIG. 5 is the display of FIG. 2 displaying a complex maneuver instruction view.

Referring to FIG. 5, another complex maneuver instruction view 68' is displayed. In this disclosed embodiment the maneuver instruction view 68' illustrates a third upcoming maneuver 70''' that is in close proximity to the second maneuver instruction 70". The relative distance between the end of the second maneuver instruction 70" and the beginning of the third maneuver instruction 70''' is less than the distance L. Further, no intervening roads 54 fall within distance L.

The third upcoming maneuver 70''' includes the maneuver sequence notation 62 of "C". The display 24 is shifted from the previous complex maneuver instruction view 68 (FIG. 4) to the next complex maneuver instruction view 68' (FIG. 5) while the vehicle 21 is in the process of completing the second maneuver instruction 70". Notably, by displaying the complex maneuver instruction view 68' which overlaps and displays maneuver instruction "B" on two subsequent complex maneuver instruction views 68, 68', a user is less likely to be confused by two independent but identical maneuver instructions (represented by maneuver instruction "A" and "C").

Because intervening road 54' is located immediately prior to the third maneuver instruction 70''' along the recommended route 61, it would be possible for a user to confuse two independent right turn maneuver instructions from the known single maneuver instruction view and incorrectly turn right on road 54'. The present invention prevents such an incorrect maneuver by concatenating a plurality of maneuver instructions 70 and by providing maneuver sequence notation 62. Further, by overlapping the second maneuver instruction 70' 'B' from the previous 68 to the next complex maneuver instruction view 68', the user is made aware of the immediacy of the third upcoming maneuver 70''' "C" while prevented from mistakenly turning onto road 54'.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

I claim:

1. A vehicle navigation system comprising:
   a database including a plurality of roads;
   a route determination system, said system determining a route to said destination via a plurality of maneuvers on said plurality of roads, said plurality of maneuvers including a first and a second maneuver;
   a CPU for determining a relationship between said first and said second maneuver; and
   a display for simultaneously displaying a concatenated first and second graphical maneuver instruction having a maneuver sequence notation overlying at least a portion of each of said first and second maneuver instruction in response to said relationship between said first and said second maneuver.

2. The vehicle navigation system of claim 1 further including,
   a user input device for selecting a desired destination for the vehicle relative to said database of roads; and
   a position determining system, said position determining system determining a position of the vehicle relative to said plurality of roads.

3. A vehicle navigation system as recited in claim 1, wherein said display displays a maneuver sequence notation adjacent each of said maneuver instructions.

4. A vehicle navigation system as recited in claim 3, wherein said maneuver sequence notation is displayed in a map display mode and in a turn-by-turn maneuver mode.

5. A vehicle navigation system as recited in claim 3, wherein said maneuver sequence notation is an alphanumeric character.

6. A vehicle navigation system as recited in claim 1 wherein said display displays only said second maneuver instruction after the vehicle has completed said first maneuver.

7. A vehicle navigation system as recited in claim 1 wherein said display displays each of said first and said second maneuver instructions as a 3-dimensional arrow.

8. A vehicle navigation system as recited in claim 7 further comprising a maneuver sequence notation adjacent a tail end of each of said 3-dimensional arrow.

9. A vehicle navigation system as recited in claim 1 wherein said relationship between said first and said second maneuver includes a distance between said first and said second maneuver.

10. A vehicle navigation system as recited in claim 9 wherein said route includes a plurality of intersections leading off said route, said relationship between said first and said second maneuver including an absence of intersections leading off said route within said distance.

11. A vehicle navigation system comprising:
    a database including a plurality of roads;
    a route determination system, said system determining a route to said destination via a plurality of maneuvers on said plurality of roads; and
    a display for simultaneously displaying a maneuver sequence notation adjacent each of a plurality of graphical maneuver instructions.

12. The vehicle navigation system of claim 11 further including
    a user input device for selecting a desired destination for the vehicle relative to said database of roads; and
    a position determining system, said position determining system determining a position of the vehicle relative to said plurality of roads.

13. A vehicle navigation system as recited in claim 11, wherein said maneuver sequence notation includes single alphanumeric character.

14. A vehicle navigation system as recited in claim 11, further comprising a CPU to locate said maneuver sequence notation relative to said maneuver instruction.

15. A vehicle navigation system as recited in claim 14, wherein said maneuver sequence notation is located relative to said maneuver instruction via vector calculation.

16. A vehicle navigation system as recited in claim 15, wherein said vector calculation includes calculating a vector average.

17. A vehicle navigation system as recited in claim 15, wherein said vector calculation includes calculating the negative of a vector average.

18. A vehicle navigation system as recited in claim 11 wherein each of said plurality of maneuver instructions is a 3-dimensional arrow.

19. A vehicle navigation system as recited in claim 18 wherein said maneuver sequence notation is adjacent a tail end of said 3-dimensional arrow.

20. A vehicle navigation system as recited in claim 18 wherein said display displays said maneuver sequence notation adjacent a tail end of said 3-dimensional arrow.

21. A vehicle navigation system as recited in claim 11, wherein said display displays a maneuver sequence notation adjacent each of said maneuver instructions.

22. A vehicle navigation system comprising:
    a database including a plurality of roads;
    a route determination system, said system determining a route to said destination via a plurality of maneuvers on said plurality of roads;
    a system for determining the position of the vehicle relative to said database of roads;
    a user input device for selecting a desired destination for the vehicle relative to said database of roads;
    a position determining system, said position determining system determining a position of the vehicle relative to said plurality of roads; and
    a display for simultaneously displaying said position of the vehicle relative to said plurality of roads and an alphanumeric maneuver sequence notation adjacent each of a plurality of graphical upcoming maneuvers.

23. A vehicle navigation system as recited in claim 22 further comprising a CPU communicating with said display, said CPU determining a relationship between a first and a second maneuver.

24. A vehicle navigation system as recited in claim 22 wherein said display displays a concatenated first and second maneuver instruction in response to said relationship between said first and said second maneuver.

25. A vehicle navigation system as recited in claim 22 wherein said system for determining the position of the vehicle includes a GPS receiver.

26. A method for guiding a user of a vehicle navigation system alone a route, said method comprising the following steps:
    (a) determining a route on a plurality of roads to a destination via a plurality of maneuvers;

(b) simultaneously displaying a plurality of graphical maneuver instructions based upon said plurality of maneuvers; and (c) labeling each of said plurality of maneuver instructions determined in said step (a) with a maneuver sequence notation.

27. The method of claim 26 wherein said step (c) includes locating said maneuver sequence notation relative to each of said plurality of maneuvers via vector calculation.

28. The method of claim 27 wherein said vector calculation includes calculating a negative average vector of a first and a second vector, said first vector based upon a first portion of said route and said second vector based upon a second portion of said route; and locating said maneuver sequence notation along said negative average vector.

29. A method for navigating a vehicle including the steps of:

(a) determining a route on a plurality of roads to a destination via a plurality of maneuvers, said route including a first maneuver and a second maneuver and a third maneuver;

(b) determining a relationship between said first maneuver and said second maneuver and said third maneuver;

(d) simultaneously displaying a concatenated first and second graphical maneuver instruction in response to said relationship between said first and said second maneuver determined in said step (b);

(e) clearing the first graphical maneuver instruction; and (f) simultaneously displaying a concatenated graphical maneuver instruction having the second graphical maneuver instruction and a third graphical maneuver instruction in response to a relationship between said second and said third maneuver determined in said step (d) alter the vehicle has completed the first maneuver.

30. The method of claim 29 further including the step of displaying only said second maneuver instruction after the vehicle has completed said first maneuver.

31. The method of claim 29 wherein said step (b) is based upon a distance between said first and said second maneuver.

32. The method of claim 29 wherein said step (b) is based upon whether an intervening road intersects a distance between said first and said second maneuver.

33. The method of claim 29 further including the step of displaying said second maneuver instruction concatenated with a third maneuver instruction after the vehicle has completed said first maneuver.

34. A vehicle navigation system as recited in claim 8 wherein said maneuver sequence notation is a single character.

* * * * *

UNITED STATES PATENT AND TRADEMARK OFFICE
CERTIFICATE OF CORRECTION

PATENT NO. : 6,397,145 B1  
DATED : May 28, 2002  
INVENTOR(S) : Millington

It is certified that error appears in the above-identified patent and that said Letters Patent is hereby corrected as shown below:

Column 7,  
Line 21, cancel "graphical";  
Line 21, after "maneuver instruction" insert -- overlaid on a map display --;  
Line 66, cancel "geographical";  
Line 66, after "maneuver instructions" insert -- overlaid on a map display --;

Column 8,  
Line 50, cancel "geographical";  
Line 50, after "maneuver" insert -- overlaid on a map display --;

Column 9,  
Line 1, cancel "geographical";  
Line 2, after "maneuver instructions" insert -- overlaid on a map display --;  
Line 27, cancel "graphical";  
Line 27, after "maneuver instruction" insert -- overlaid on a map display --;

Column 10,  
Lines 3 and 5, cancel "graphical";

Signed and Sealed this

Fifteenth Day of October, 2002

*Attest:*

*Attesting Officer*

JAMES E. ROGAN  
*Director of the United States Patent and Trademark Office*